(12) United States Patent
Iizuka

(10) Patent No.: US 7,853,017 B2
(45) Date of Patent: Dec. 14, 2010

(54) METHOD AND APPARATUS FOR ENCRYPTED PRINT PROCESSING

(75) Inventor: Hiroko Iizuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1148 days.

(21) Appl. No.: 11/219,870

(22) Filed: Sep. 7, 2005

(65) Prior Publication Data

US 2006/0050879 A1 Mar. 9, 2006

(30) Foreign Application Priority Data

Sep. 9, 2004 (JP) ............................. 2004-262967
Aug. 26, 2005 (JP) ............................. 2005-246434

(51) Int. Cl.
*G09C 3/08* (2006.01)

(52) U.S. Cl. ..................... 380/51; 358/1.9; 358/1.13; 380/55; 713/150

(58) Field of Classification Search ............... 358/1.15, 358/1.1, 1; 380/43, 200, 211, 51; 713/176, 713/156, 166, 193
See application file for complete search history.

(56) References Cited

U.S. PATENT DOCUMENTS

| | | | | |
|---|---|---|---|---|
| 6,978,019 | B1 * | 12/2005 | Lapstun et al. ................ | 380/51 |
| 7,330,974 | B1 * | 2/2008 | Silverbrook et al. ........ | 713/176 |
| 7,369,271 | B2 | 5/2008 | Itagaki | |
| 7,554,694 | B2 | 6/2009 | Itagaki | |
| 7,647,074 | B2 * | 1/2010 | McCoog et al. ............. | 455/566 |
| 2002/0108035 | A1 | 8/2002 | Herley et al. | |
| 2003/0081247 | A1 * | 5/2003 | Sharma ..................... | 358/1.15 |
| 2003/0090712 | A1 * | 5/2003 | Lenz et al. ................. | 358/1.15 |
| 2004/0128280 | A1 | 7/2004 | Gomi et al. | |
| 2004/0190714 | A1 * | 9/2004 | Masui et al. .................. | 380/43 |
| 2005/0146735 | A1 * | 7/2005 | Ternasky et al. ............. | 358/1.9 |
| 2005/0177739 | A1 * | 8/2005 | Ferlitsch et al. ............. | 713/189 |
| 2005/0243355 | A1 * | 11/2005 | Foehr et al. ................. | 358/1.13 |

FOREIGN PATENT DOCUMENTS

| | | |
|---|---|---|
| JP | 2000-276309 | 10/2000 |
| JP | 2001-186358 | 7/2001 |
| JP | 2002-351317 | 12/2002 |
| JP | 2004-037525 | 2/2004 |
| JP | 2004-155121 | 6/2004 |
| JP | 2004-171114 | 6/2004 |
| JP | 2004-199409 | 7/2004 |

* cited by examiner

*Primary Examiner*—Taghi T Arani
*Assistant Examiner*—Jason Lee
(74) *Attorney, Agent, or Firm*—Fitzpatrick, Cella, Harper & Scinto

(57) ABSTRACT

According to a print controller of this embodiment, when a part of print data is specified to be encrypted, a client 102 determines functions supported by a printer 104. If the printer 104 is capable of handling partial encryption, the client 102 encrypts the specified portion, specifies the portion by PDL commands or XML tags, and sends the print data to the printer. The printer 104 decrypts it and then prints it out. Meanwhile, in the case of a printer 151 which does not support partially encrypted printing, printing is terminated, or the print data is sent to the printer 151 after replacing the portion specified to be encrypted with a different character string.

6 Claims, 16 Drawing Sheets

F I G. 10
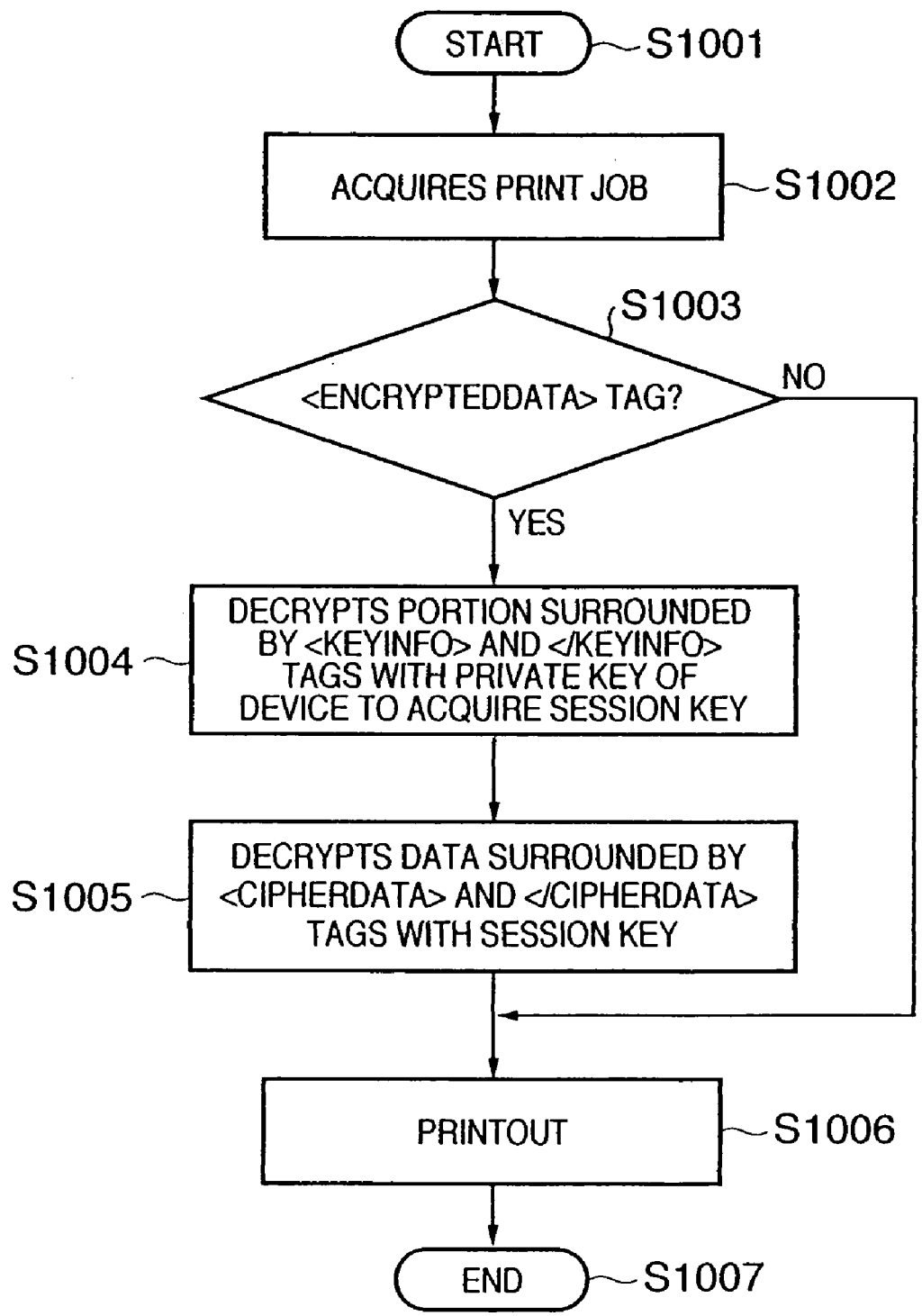

BLOCK DIAGRAMS OF DRIVER AND APPLICATION

METHOD FOR SPECIFYING PORTION TO BE ENCRYPTED BY SELECTION FROM UI

METHOD AND APPARATUS FOR ENCRYPTED PRINT PROCESSING

FIELD OF THE INVENTION

The present invention relates to a method and apparatus for encrypted print processing for the purpose of protecting data security, for example, between a printer driver and the like executed on a computer and a printer.

BACKGROUND OF THE INVENTION

Conventionally, it has been common that a printer is in one-to-one connection with a computer, while it is common recently that a printer is used as a so-called network printer shared by multiple computers via a network. When such a network printer is used, data to be printed (print data) flows through the shared network. Therefore, there is a possibility that the print data itself may be stolen, or, when the printer is away from a user, printed matter may be read or taken away by an unauthorized person during the time after the printed matter is outputted and before the user takes the printed matter. Accordingly, a technology for protection of security, a so-called secure printing technology, has been devised to protect data to be printed from an unauthorized person who has not given authorization to access the data.

To protect security of print data between a printer driver on a computer and a printer, encryption of data is performed. The printer driver performs encryption processing for all the print data, entire PDL data in the case of a PDL printer, to be sent to the printer before sending the data to the printer. The printer has to receive the encrypted PDL data, perform decryption processing, and then performs print processing based on the decrypted PDL data (for example, see Patent Document 1).

There has existed a technique for encrypting predetermined higher-order bits of image data or encrypting only predetermined print control commands included in print data to send the data to an image forming apparatus (Patent Document 2).

[Patent Document 1] Japanese Patent Laid-Open No. 2001-186358

[Patent Document 2] Japanese Patent Laid-Open No. 2000-276309

SUMMARY OF THE INVENTION

In the conventional encrypted print processing technology, a driver performs encryption processing for entire PDL data, and therefore, more time is required for processing accompanying encryption, especially for decryption processing performed on the printer, as the data amount increases. This causes significant deterioration of performance. Thus, it has been difficult to protect data between a driver and a printer from intercept or alteration of data while maintaining performance.

Furthermore, since it is not possible to specify and encrypt a desired portion of document data, there is a problem that certain protection of a desired portion of document is impossible. Meanwhile, if entire document data or print data is encrypted, there is presented a problem that the processing load of encrypting the data is large.

A system is being devised in which a printing apparatus capable of interpreting document data generated by an application and a printing apparatus incapable of interpreting document data but capable of interpreting print data generated by a printer driver are mixedly exist. Even if document data is immediately sent to a printing apparatus incapable of interpreting document data but capable of interpreting print data generated by a printer driver, information of the document data cannot be outputted. Therefore, print data is generated from the document data with the use of a printer driver.

In this case, if data encrypted with an encryption key which the printer driver does not know is inputted to the printer driver from an application or the like, there is presented a problem that the printer driver cannot decrypt the document data. Furthermore, print data is readable if it has not been encrypted, and there is also presented a problem that security of the data on a communication channel cannot be ensured.

The present invention has been made in order to solve at least one of the above problems. An object of the present invention is to certainly protect a portion of document data which is to be protected, from alteration or intercept on a communication channel as well as reducing the processing load of encryption.

Another object of the present invention is to provide a mechanism enabling output of data for which encryption processing has been performed by a printer driver or an application in an environment where a printing apparatus capable of interpreting document data generated by the application and a printing apparatus incapable of interpreting mixedly exist.

To achieve the above-mentioned objects, the present invention has the following configuration.

A print controller comprising:

an acquisition unit that acquires document data;

an identification unit that identifies data to be encrypted, from the document data acquired by the acquisition unit;

an encryption unit that encrypts the data identified by the identification unit; and a sending unit that sends the data encrypted by the encryption unit to an image forming apparatus, wherein the identification unit identifies data specified by specification information as an encryption target.

Other features and advantageous of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a flowchart showing the operation of an XAML printer in the system of FIG. 1;

DETAILED DESCRIPTION OF THE PREFERRED EMBODIMENTS

<System Configuration>

Figure 1:
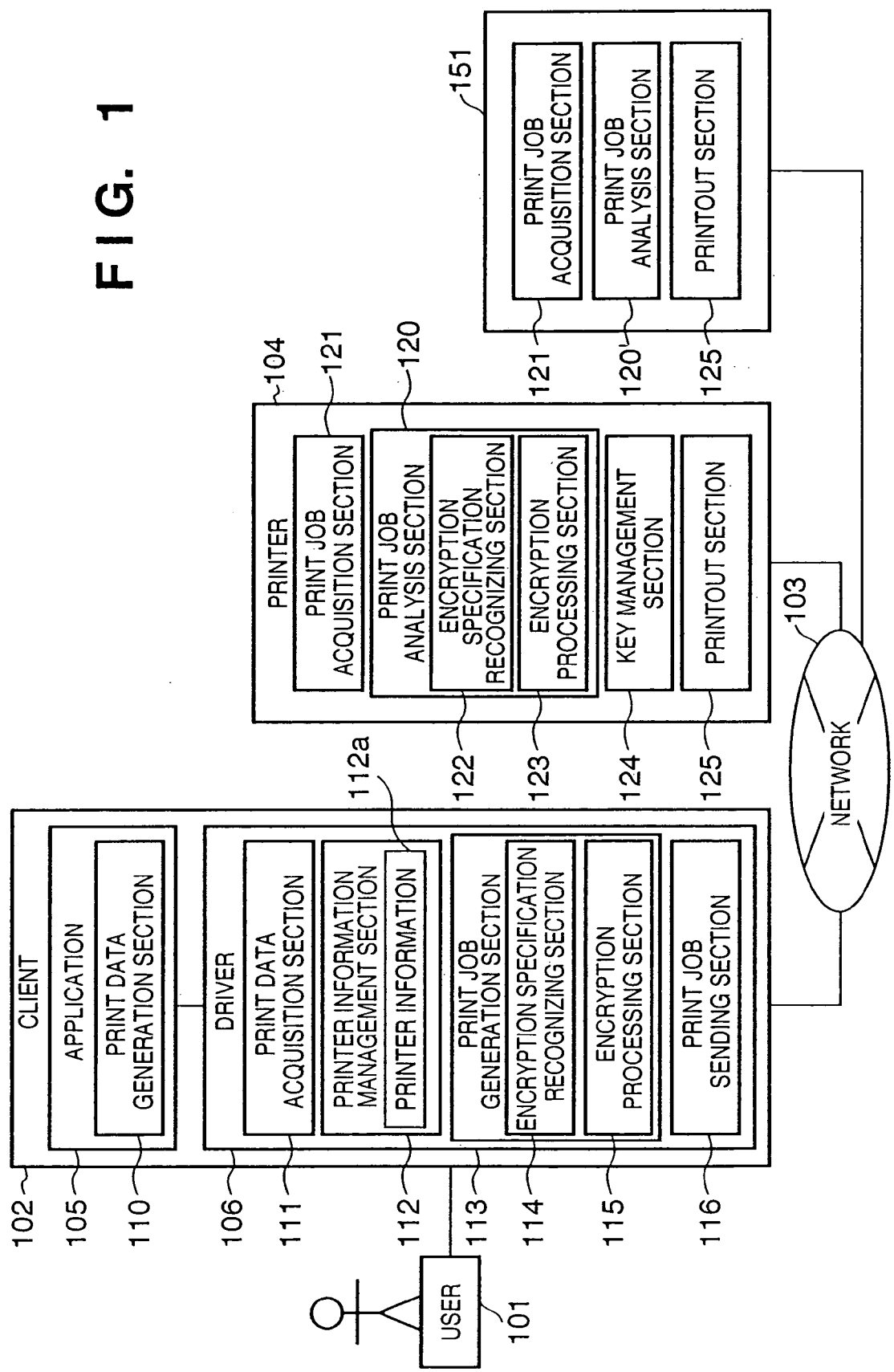
FIG. 1 is a block diagram of a system according to an embodiment of the present invention.

FIG. 1 is a block diagram of a system according to an embodiment of the present invention. In FIG. 1, a client computer (hereinafter referred to as a client) 102 to be used by a user 101 and printers 104 and 151 are connected via a network 103. The client 102 is provided with an application program (hereinafter referred to as an application) 105 for generating print data and a printer driver program (hereinafter referred to simply as a driver) 106 for controlling the printers 104 and 151. In this embodiment, the application 105 and the printer 104 are assumed to be compatible with XAML (Extensible Application Markup Language) which supports partial encryption, and the printer 151 is a so-called legacy printer which is not compatible with XAML. That is, the application 105 can generate, output, read and process data in the XAML format. XAML is a kind of language described in XML, the specification of which has been determined by Microsoft Corporation. Data defined in a language described in XML is often referred to as an XML document. In this embodiment, however, it is referred to as XML data. Therefore, data described in the XAML is also XML data.

XML data is text data, which is in a data format allowing persons other than the creator of the data to easily understand the content. For XML, specifications for partial encryption of data are specified as a standard for the purpose of protecting particular important information (such as a credit card number and personal information, for example). Accordingly, XML-based XAML also can describe partially encrypted data. XML may be adopted as a standard format for securing compatibility of data among computers. In such a case, data outputted from a computer is XML data, and therefore, an XML compatible computer is compatible with partial encryption of XML and can generate partially encrypted data. However, there may be a case where, even if a computer is compatible with XML, the printer used by the computer is incompatible with XML. Furthermore, if it is taken into account that a printer may be used in a network environment, there may be a case where a printer compatible with XML and a printer incompatible with XML are mixedly exist on the same network.

Accordingly, in this embodiment, the client computer 102 is assumed to be an XML compatible computer, and it outputs XML data as print data to a printer if the printer is compatible with XML (referred to as an XML printer), and outputs print data described in PDL or the like, which can be processed by the printer if the printer is incompatible with XML. It is assumed that XML data is not outputted to a printer if the client computer 102 is not an XML compatible computer. Description will be made on the assumption that the XML printer of this embodiment does not receive data other than XML data. However, an XML printer may be used which has an ability of determining the description format of received data and an ability of interpreting and executing conventional PDL. In this embodiment, "partial encryption" or "partially encrypted xx" are often described simply as "encryption" or "encrypted xx" by omitting "partial" or "partially". However, in this embodiment, "encryption" means "partial encryption" in which a part of data is encrypted.

Furthermore, the application 105 is provided with a print data generation section 110 for generating data to be printed, for example, based on data created by the application 105 and the like. The driver 106 is provided with a print data acquisition section 111 for acquiring print data generated by the print data generation section 110 of the application 105, a printer information management section 112 for storing, maintaining and managing information about the printer 104, a print job generation section 113 for generating a print job based on the print data acquired by the print data acquisition section 111, and a print job sending section 116 for sending the generated print job to the printer 104. The print job generation section 113 is provided with an encryption specification recognizing section 114 for recognizing specification of partial encryption included in print data or a specified encryption-target portion, and an encryption processing section 115 for performing encryption processing, such as encryption of a specified portion, to be described later with reference to FIG. 4 and the like, based on specification of partial encryption.

The user 101 uses the application 105 on the client 102 to issue a request to generate a print job accompanied by partial encryption. For example, the user 101 specifies encryption of a portion specified as an encryption-target portion or a predetermined encryption-target portion from among data displayed on the display section of the client 102 and also specifies printing of the data. Specification of encryption is performed, for example, by selecting an item for instructing encryption from a menu or the like. This specification to perform partial encryption and the printing instruction accompanied by specification of an encryption-target portion are to be a request to generate a print job accompanied by partial encryption.

On receiving the request to generate a print job accompanied by partial encryption, the print data generation section 110 of the application 105 generates print data for which a specified portion of which is encrypted. The application 105 communicates the user's request to generate a print job accompanied by partial encryption to the printer information management section 112 of the driver 106. On receiving the request to generate a print job accompanied by partial encryption, the printer information management section 112 determines whether the sending destination printer is an XML compatible printer or a legacy printer (PDL printer) based on stored printer information 112*a* and returns the determination result to the application 105. The printer information 112*a* may be a code embedded in a driver program or may be information acquired from the printer.

When receiving the determination result to the effect that the printer is an XML-compatible printer from the printer information management section 112, the application 105 surrounds a specified portion of the print data specified to be partially encrypted by encryption specifying tags, encrypts the content of the portion in accordance with an XML encryption format with a session key separately specified, generates print data in an XAML format, and hands the data to the print data acquisition section 111 of the driver together with the session key. To hand the data together with the session key can be realized by adding the session key surrounded by tags indicating that it is a session key to the data. When receiving the determination result to the effect that the printer is a legacy printer (PDL printer), the application 105 surrounds a specified portion of the print data specified to be partially encrypted by encryption specifying tags, and hands the data to the print data acquisition section 111 of the driver without encrypting the content of the portion. In this manner, the application 105 hands XML data to the driver 106.

The print data acquisition section 111 hands the received print data to the encryption specification recognizing section 114 of the print job generation section 113. The encryption specification recognizing section 114 recognizes the encryption specifying tags in the received print data and requests processing for partially encrypted printing from the encryption processing section 115. The processing for partially encrypted printing differs depending on whether the sending destination printer is an XAML printer or a legacy printer. If the printer is an XAML printer, the portion surrounded by the tags where the session key is stored is encrypted by the public key of the printer and rewritten with it. An XAML printer can interpret and process data described in XAML and print outs it in accordance with the description. If the printer is a legacy printer, the portion surrounded by the encryption specifying tags is converted to PDL data, then encrypted with a generated session key, and surrounded by PDL commands indicating that the data is encrypted to generate a print job. The session key is encrypted by the public key of the printer and added to the print job. The generated print job is sent to the printer 104 by the print job sending section 116.

As described above, document data is acquired, and data to be encrypted is identified by an application or a printer driver from the document data. The data identified by the application or the printer driver is encrypted by an OS, the printer driver or the application. Then, the encrypted data may be sent to the printer via a LAN card.

The application or the printer driver may identify data specified by encryption specifying tags, an example of specification information, as an encryption target.

The application or the printer driver may detect tag information in document data as encryption specifying tags when the tag information included in the document data and an encryption specifying tag registered in advance as specification information in a print controller correspond to each other.

A print job is acquired by a print job acquisition section 121 of a printer and handed to a print job analysis section 120. The print job analysis section 120 hands the print job to an encryption specification recognizing section 122 to cause a portion for which encryption has been specified to be recognized. The encryption specification recognizing section 122 analyzes the received print job, and, if an encryption specifying tag is found, it requests processing for partially encrypted printing from an encryption processing section. The processing for partially encrypted printing to be performed by the encryption processing section differs depending on whether the printer is a an XAML compatible printer or a legacy printer. If the printer is an XAML compatible printer, a pair of the encryption specifying tags is recognized; the portion surrounded by the tags, in which an encrypted session key is stored, is decrypted with the private key of the printer which is managed by a public key/private key management section 124 so that the encrypted data is decrypted; and the decrypted XML data is returned to the print job analysis section 120.

When analysis of all the print job is completed, the print job analysis section 120 hands the print job to a printout section 125 to print it out.

Meanwhile, if the printer is a legacy printer, a PDL command indicating that encryption has been performed is recognized; an encrypted session key in the print job is decrypted by the private key of the printer managed by the public key/private key management section 124; data for which partial encryption has been performed is decrypted; and the decrypted PDL data is returned to the print job analysis section 120. When analysis of all the print job is completed, the print job analysis section 120 hands the print job to the printout section 125 to print it out.

<Hardware Configuration>

Figure 2:
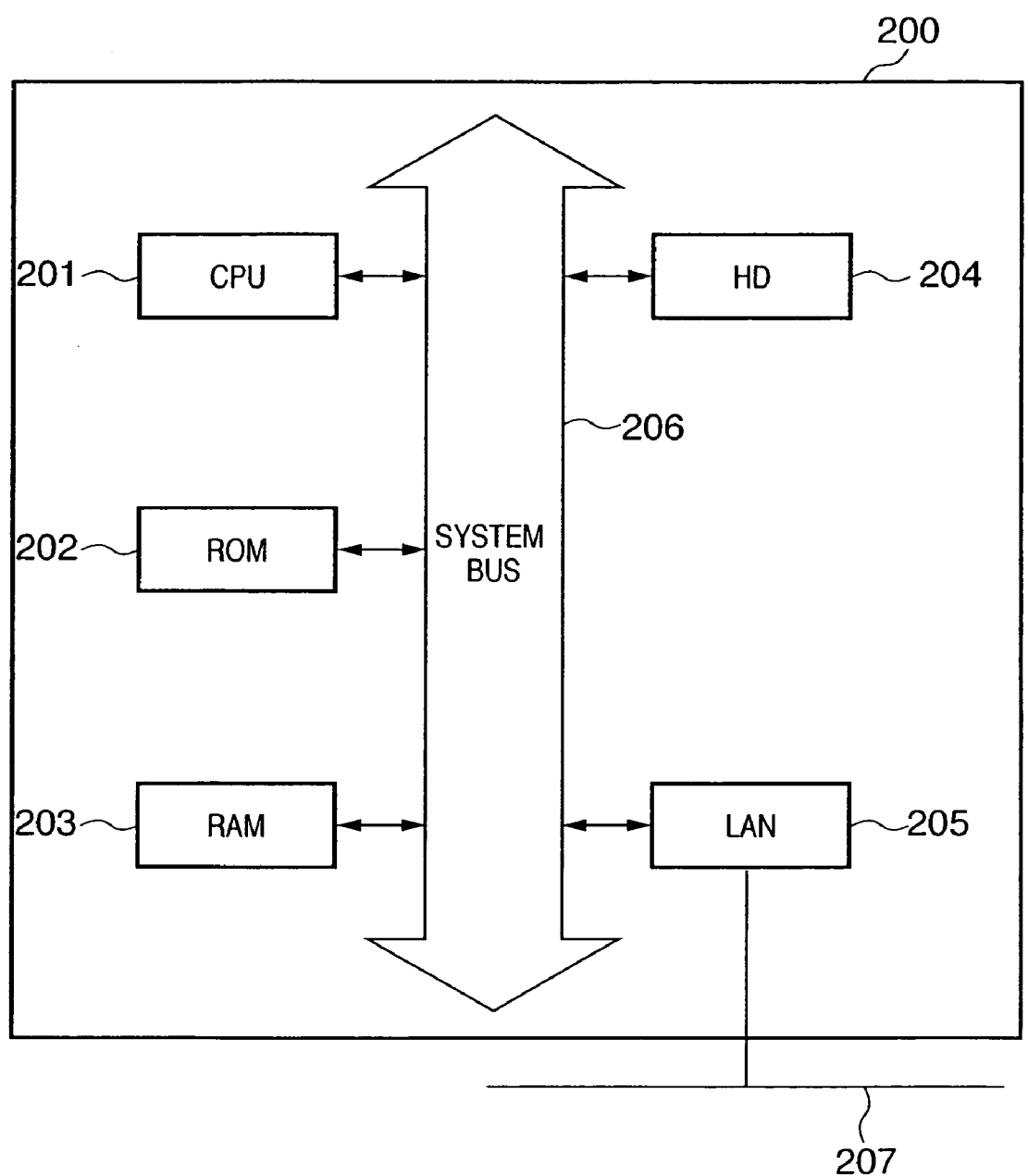
FIG. 2 shows the internal configuration of a computer constituting a client 102 or a printer 104 of the present invention.

FIG. 2 shows the internal configuration of a computer constituting a client 102 or printers 104 and 151 of the present invention. In FIG. 2, reference numeral 200 denotes a client or a printer of the present invention, and is equivalent to the client computer 102 or the printers 104 and 151 in FIG. 1. The client or printer 200 is provided with a CPU 201 for executing software stored in a ROM 202 or a hard disk (HD) 204, and collectively controls respective devices connected to a system bus 206. Reference numeral 203 denotes a RAM, which functions as a main memory, a work area and the like of the CPU 201. Reference numeral 205 denotes a LAN, which bidirectionally exchanges data with other network equipment or other PC's via a network 207. The CPU 201 realizes the procedures shown by flowcharts in FIG. 4 and the subsequent figures by executing a program. The printers 104 and 151 have a printer engine and an engine controller for controlling the engine in addition to the controller configured as in FIG. 2. However, since the operation of the printer of this embodiment is performed by the controller section in FIG. 2, description of the configuration of the printer engine and the engine controller are omitted.

<Example of Data>

Figure 12:
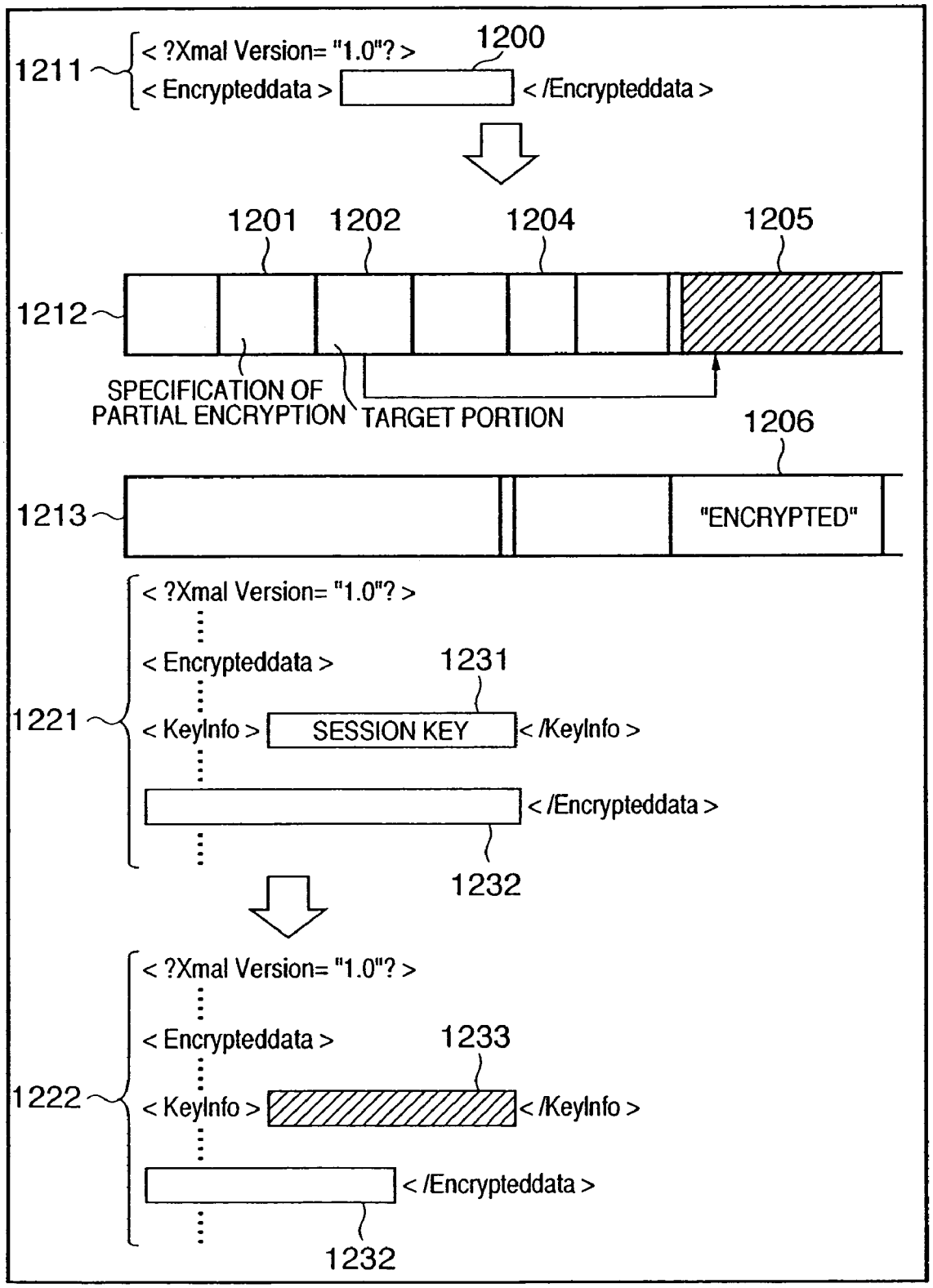
FIG. 12 shows an example of data to be handled in a printer system of this embodiment.

The system operation of the above-described embodiment will be described below with reference to flowcharts. FIG. 12 shows an example of data. Print data 1211 is generated by the application 105 when the printer is determined to be a legacy printer, and the data is XML data. Though an encryption specified portion 1200 is specified by <EncryptedData>and </EncryptedData>tags, its content is plain text. PDL data 1212 is print data accompanying a print job to be generated for a legacy printer capable of processing PDL which supports partial encryption. The PDL data 1212 includes encryption specifying information 1201, which is an example of specification information for specifying partial encryption, target portion information 1202 for identifying an encryption-target portion and a session key 1204 encrypted with the private key of the printer in its header portion. In the data body portion, an encryption-target portion 1205 identified by the target portion information 1202 is encrypted with the session key. PDL data 1213 is print data accompanying a print job to be generated for a legacy printer incapable of processing PDL which supports partial encryption. The encryption specifying information 1201 or the target portion information 1202, which cannot be recognized or processed by a printer, are not included in the header information. In an encryption-target portion 1206, the original information has been replaced with different specified information (the character string "encrypted" in FIG. 12).

Meanwhile, print data 1221 is generated by the application 105 when the printer is determined to be an XAML printer, and the data is XML. An encryption specified portion 1232 is specified by <EncryptedData> and </EncryptedData> tags, and the content of the portion has been encrypted by a session key 1231 specified by <KeyInfo> and </KeyInfo> tags described between the <EncryptedData> and </EncryptedData> tags. XML data 1222 is print data accompanying a print job outputted to the printer by the printer driver. The XML data 1222 is different from the XML data 1221 in that the session key specified by its <KeyInfo> and </KeyInfo> tags is data 1233 which has been encrypted by the public key of the printer.

<Procedure for Print Processing by the Application>

Figure 3:
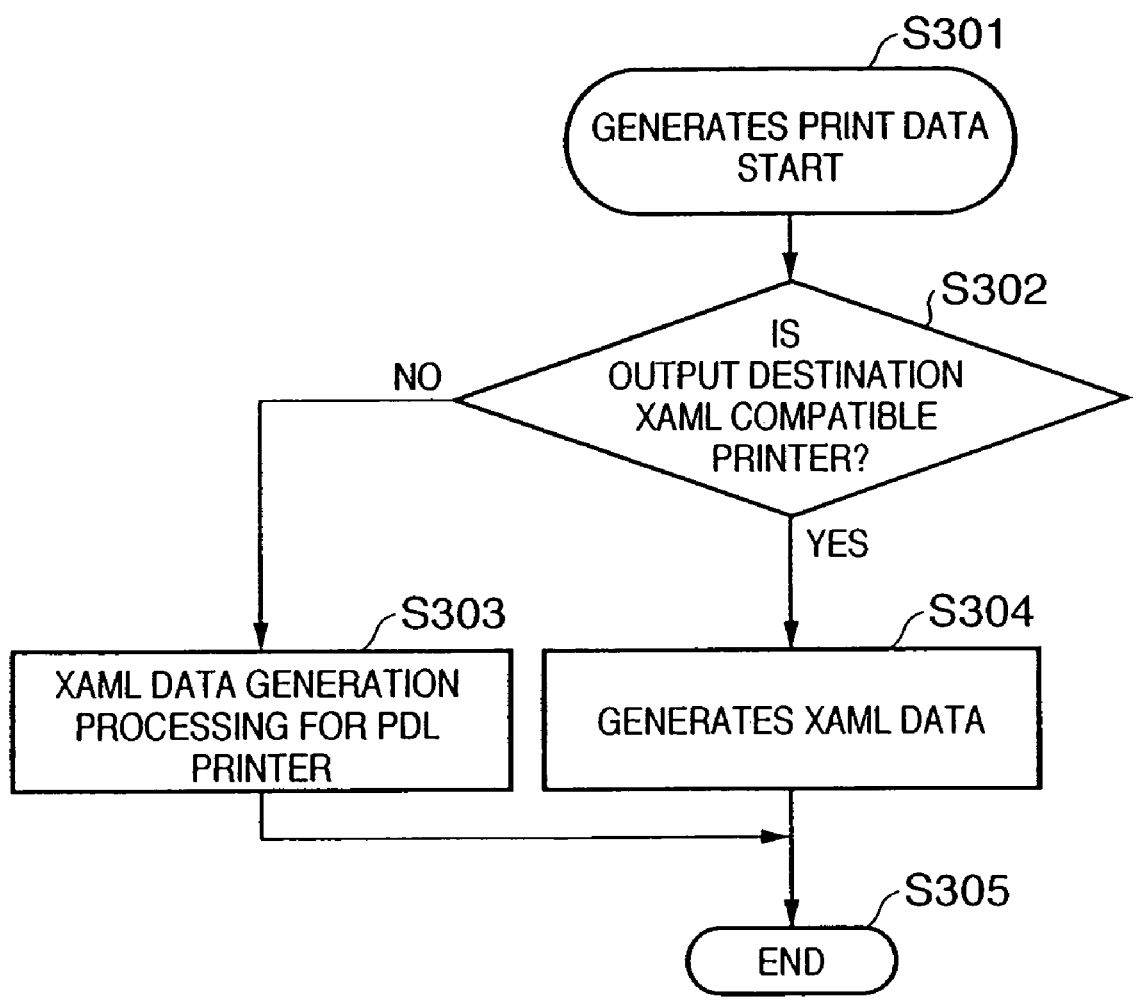
FIG. 3 is a flowchart showing the operation of an application of this embodiment.

The operation by the print data generation section 110 of the application 105 in the system of FIG. 1 is shown in FIG. 3. When the program starts, the print data generation section 110 inquires of the driver 106 about whether the output destination printer is an XML compatible printer (step S302). The printer information management section 112 of the driver 106 responses to the print data generation section 110 based on the printer information 112a. If the printer is an XAML compatible printer, then the print data generation section 110 generates the XML data 1221 shown in FIG. 12, and the process ends (step S304). If the printer is not an XAML compatible printer, then print data generation processing for a PDL printer is performed to generate the XAML data 1211 shown in FIG. 12, and then the process ends (step S303). The difference between the both data is that an encryption-target portion is only indicated by <EncryptedData> and </EncryptedData> tags which indicate that encryption is provided, without encryption thereof in the case of a PDL printer, while an encryption-target portion is encrypted in the case of an XAML printer. In the latter case, a session key used for the encryption is added to the data, of course.

Figure 13:
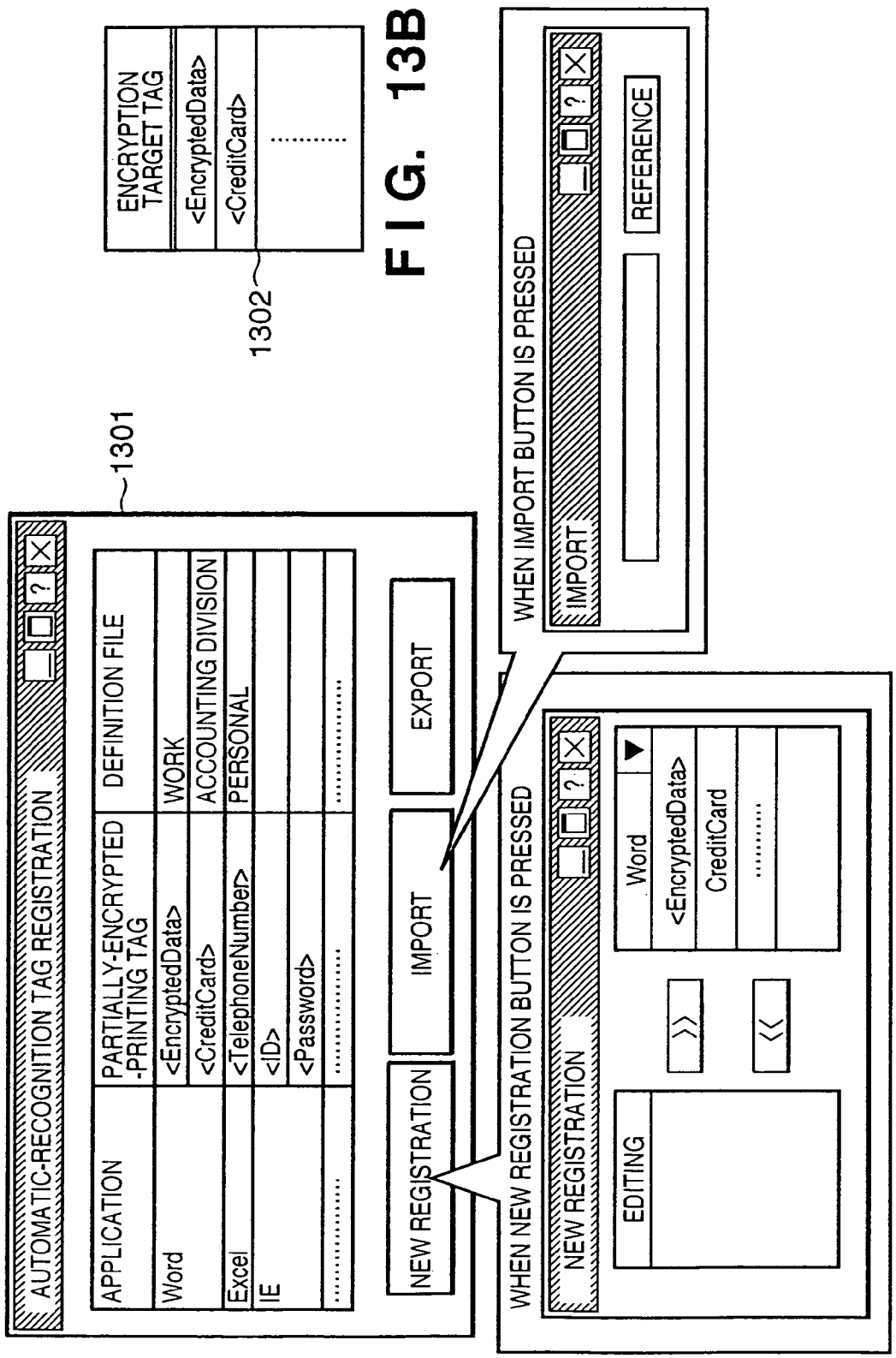
FIGS. 13A and 13B show an example of data to be handled by the application of this embodiment in the printer system.

FIG. 13A shows a user interface for the application 105 to set a portion to be encrypted, and FIG. 13B shows an example of a set tag table. By pressing an "automatic-recognition tag registration for encrypted printing" button in a printing setting menu of the application 105 (or an application 1411), a window 1301 is displayed. In this window, an operator can specify an encryption-target portion by a pair of tags. For example, a <CreditCard> tag indicating a credit card number, a <TelephoneNumber> tag indicating a telephone number, an <EncryptedData> tag for specifying encryption, and the like can be specified. Of course, the specification is performed by the operator. As the registration method, a method of making new registration by inputting text, a method of making registration by import from a CSV file, and the like. It is also possible to export the setting file in a format such as CSV to improve convenience of registration. A registered tag is registered with a table 1302 secured in a hard disk or a memory, and maintained by a UI control section 1412 in the application 1411. Data generated by an XAML compatible application in an XAML format and may include tags as shown in FIG. 13A. Specifically, the application 105 (or the application 1411) refers to the table 1302 maintained by the UI control section 1412 at the timing when printing is executed. If a tags described in the table 1302 is included in data to be printed, a print data generation section 1413 surrounds the portion surrounded by the tags, by <EncryptedData> and </EncryptedData> tags, and hands the data to the driver 106, and thereby, partial encryption can be automatically performed. Of course, this encryption specification method is only an example, and other specification methods can be adopted. It will be shown that this tag registration (input) processing can be performed by a driver 1401, with reference to FIG. 14. When the tag registration processing is performed by the driver 1401, the window 1301 and the data of registered tags are maintained by a driver UI control section 1402. Description will be now made on the processing to be performed when the tag registration processing is performed by the driver. When the tag registration processing is performed by the driver, a PDL generation section 1403 in the driver 1401 refers to the registered tag table 1302 maintained by the driver UI control section 1402 when PDL data is generated. If a tag described in the table 1302 is included in print data received from the application, the portion surrounded by the tags with <EncryptedData> and </EncryptedData> tags to encrypt the portion.

At step S303, the application data is searched for a tag registered with the table 1302, and any found tag is surrounded by <EncryptedData> and </EncryptedData> tags to indicate that encryption is specified for the portion. At step S304, any tag registered with the table 1302 is searched for. If any tag is found, a portion surrounded by a pair of the tags found is encrypted together with the tags, and the encrypted portion is surrounded by <EncryptedData> and </EncryptedData> tags to indicate that the portion is encrypted.

<Procedure for Print Processing by the Printer Driver (Incompatible with XAML)>

Figure 4:
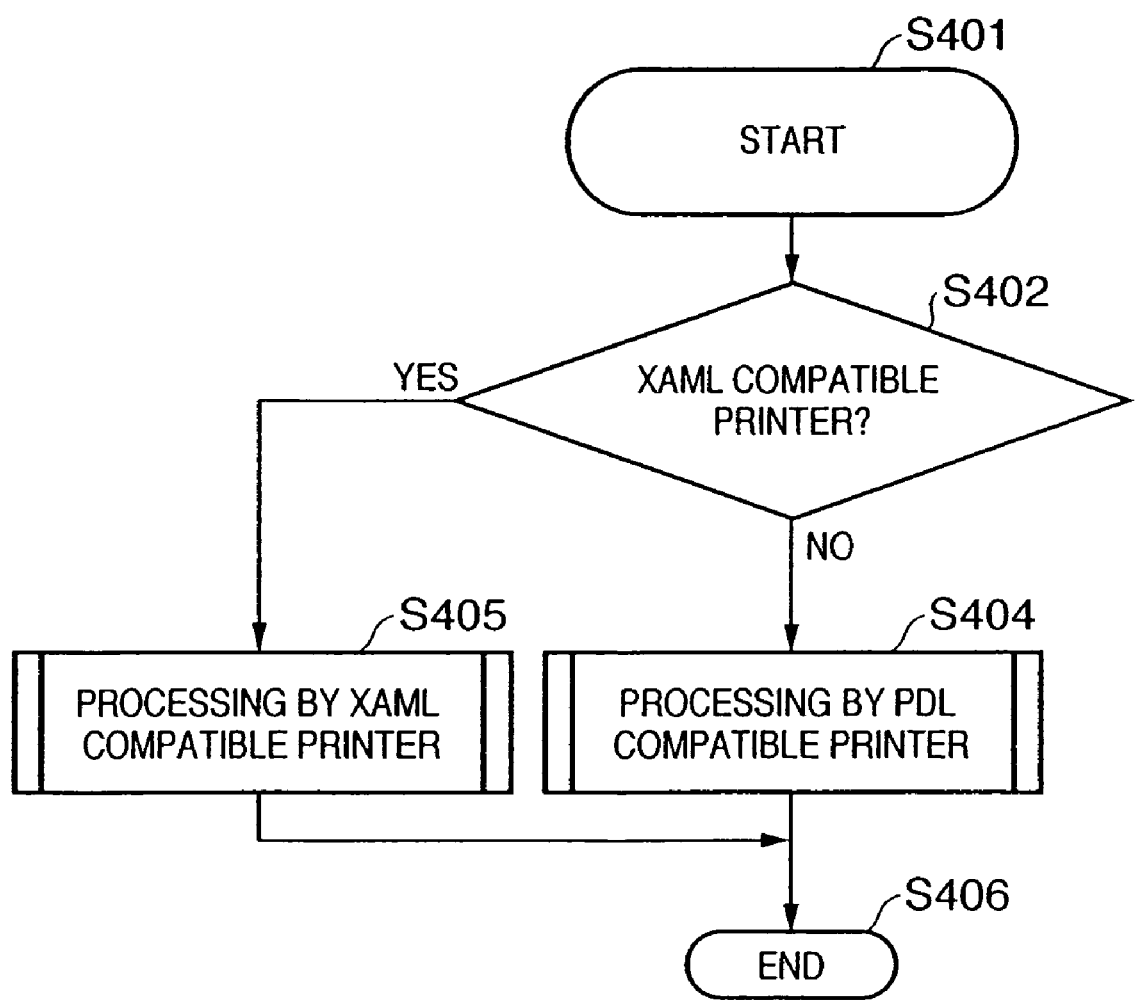
FIG. 4 shows processing to be performed by a driver immediately after the driver receives a printing request from the application.

FIG. 4 is a flowchart showing the operation of the driver 106 in the system of FIG. 1. When the program starts (step S401), the print job generation section 113 first inquires of the printer information management section 112 to determine whether the output destination printer is an XAML compatible printer at step S402. If the printer is an XAML compatible printer, then the process proceeds to step S405. At step S405, the print job generation section 113 performs print job generation processing for an XAML compatible printer and generates the XML data 1222 shown in FIG. 12, and the process ends. If the printer is not an XAML compatible printer at step S402, then the process proceeds to step S404. At step S404, the print job generation section 113 performs print job generation processing for a PDL compatible printer to generate the PDL data 1222 or the PDL data 1221 shown in FIG. 12, and the process ends.

Figure 5:
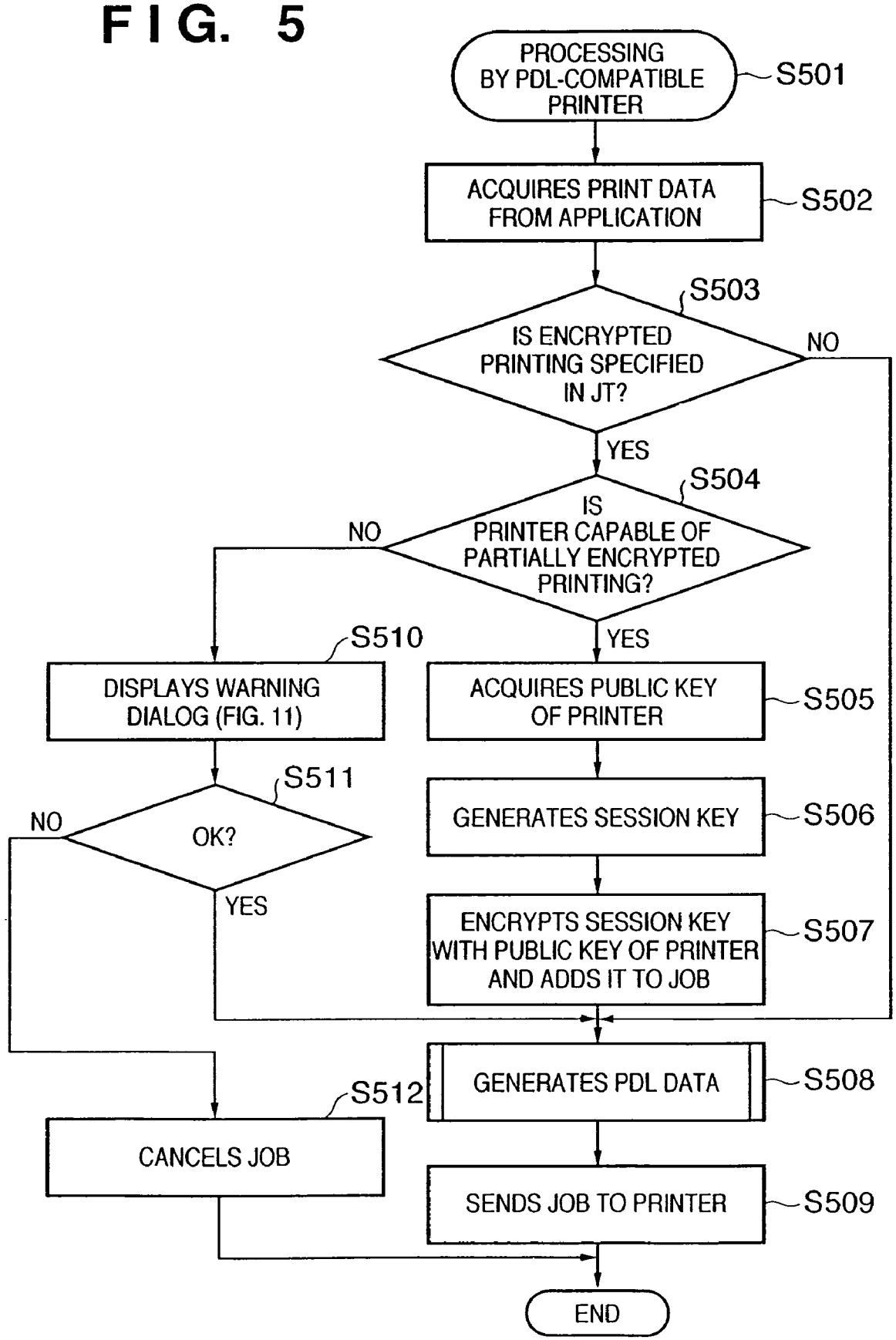
FIG. 5 is a flowchart showing the operation of step S404 in FIG. 4.

FIG. 5 is a flowchart showing the details of step 5404 in FIG. 4. This operation is performed by the CPU 201 of the client 102. When the program starts (step S501), the print data acquisition section 111 acquires print data from the application 105 at step S502,and the process proceeds to step S503. At step S503, the encryption specification recognizing section 114 determines whether printing accompanied by partial encryption is specified in a JT (job ticket). That is, the encryption specification recognizing section 114 functions as an identification means for identifying data to be encrypted, from the acquired document data. If printing accompanied by partial encryption is specified in the JT, then the process proceeds to step S504. If printing accompanied by partial encryption is not specified in the JT, then the process proceeds to step S508. In the example of FIG. 12, the application does not create a job ticket, and indicates specification of partial encryption by <EncryptedData>tags. Accordingly, by checking the existence of this tag instead of performing a JT test, it is possible to determine that printing accompanied by partial encryption is specified if the tag exists. The job ticket is information for specifying details of printing, and it may be added as information corresponding to a header of a print job even in the case of an XML compatible application. In such a case, information indicating specification of printing accompanied by partial encryption is also embedded in the job ticket (for example, like the PDL data 1212 in FIG. 12), the determination can be made by testing it.

If it is determined that printing accompanied by partial encryption is specified, then the printer information management section 112 determines at step S504 whether the printer is capable of partially encrypted printing. If the printer is capable of partially encrypted printing, then the process proceeds to step S505. If the printer is not capable of partially encrypted printing, then the process proceeds to step S510. This determination can also be made based on the printer information 112a. The determination may also be made based on the model number of the printer or based on information indicating supported functions. The information may be embedded in the printer driver or may be read from the printer 104 or 151.

At step S505, the encryption processing section 115 acquires the public key of the printer from the printer information management section 112, and the process proceeds to step S506. At step S506, the encryption processing section 115 generates a session key. Then, the process proceeds to step S507, where the session key is encrypted with the acquired printer public key, and the encrypted session key is added as data accompanying the print job, and the process proceeds to step S508. That is, the encryption processing section 115 functions as encryption means for encrypting identified data.

At step S508, the print job generation section 113 generates PDL data, and encrypts it using the above-mentioned session key before the encryption by the encryption processing section 115 which is an example of second encryption means. And any unnecessary session key which is not encrypted is deleted. In addition, it is preferable to generate PDL before encrypting the session key and after the session key is encrypted, the session key is added to the print data and transmitted. Then, the process proceeds to step S509.

At step S509, the print job sending section 116 sends the print job, and the process ends. The printer public key may be acquired from the printer or a server for managing keys via a network or may be inputted by an operator off-line.

Figure 11:
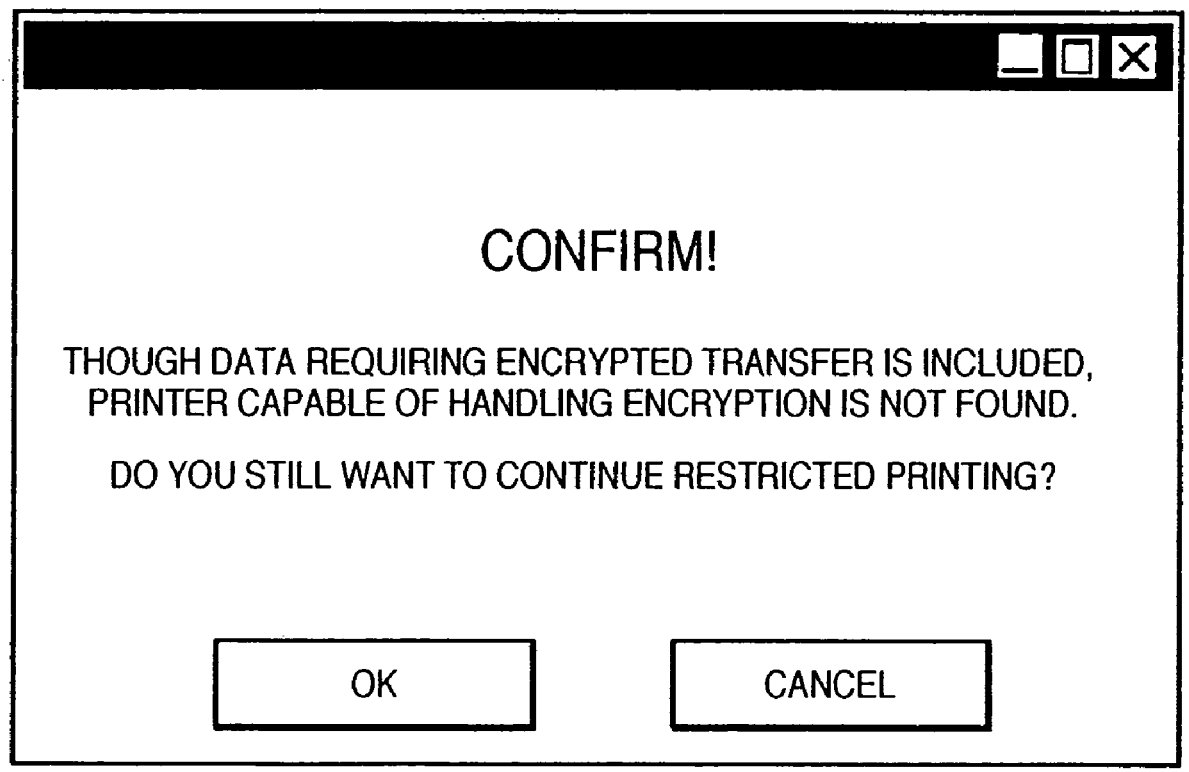
FIG. 11 shows an example of a warning dialog of step S510 in FIG. 5.

On the other hand, if the printer is not capable of partially encrypted printing, then at step S510, the encryption processing section 115 displays a warning dialog for causing a user to confirming whether or not to continue the print processing, for example, as shown in FIG. 11.

Now, a CPU which is an example of first encryption means executes the printer information management section of the printer driver. If the CPU 201 determines that the output destination of the print job is not compatible with encryption printing, the CPU 201 which is an example of notification means may notify the application 105 from the printer information management section of the determination result. The dialog as shown in FIG. 11 may be displayed by the application 105.

If continuation is confirmed at the determination at S511, for example, by pressing an OK button, then the process proceeds to step S508 to generate PDL data. When termination is confirmed, for example, by pressing a cancel button, then the process proceeds to step S512, where the job is cancelled and the process ends. That is, the encryption processing section 115 functions not only as encryption means but also confirmation means for confirming whether or not to continue printing of document data including data specified by specification information from a user.

Figure 6:
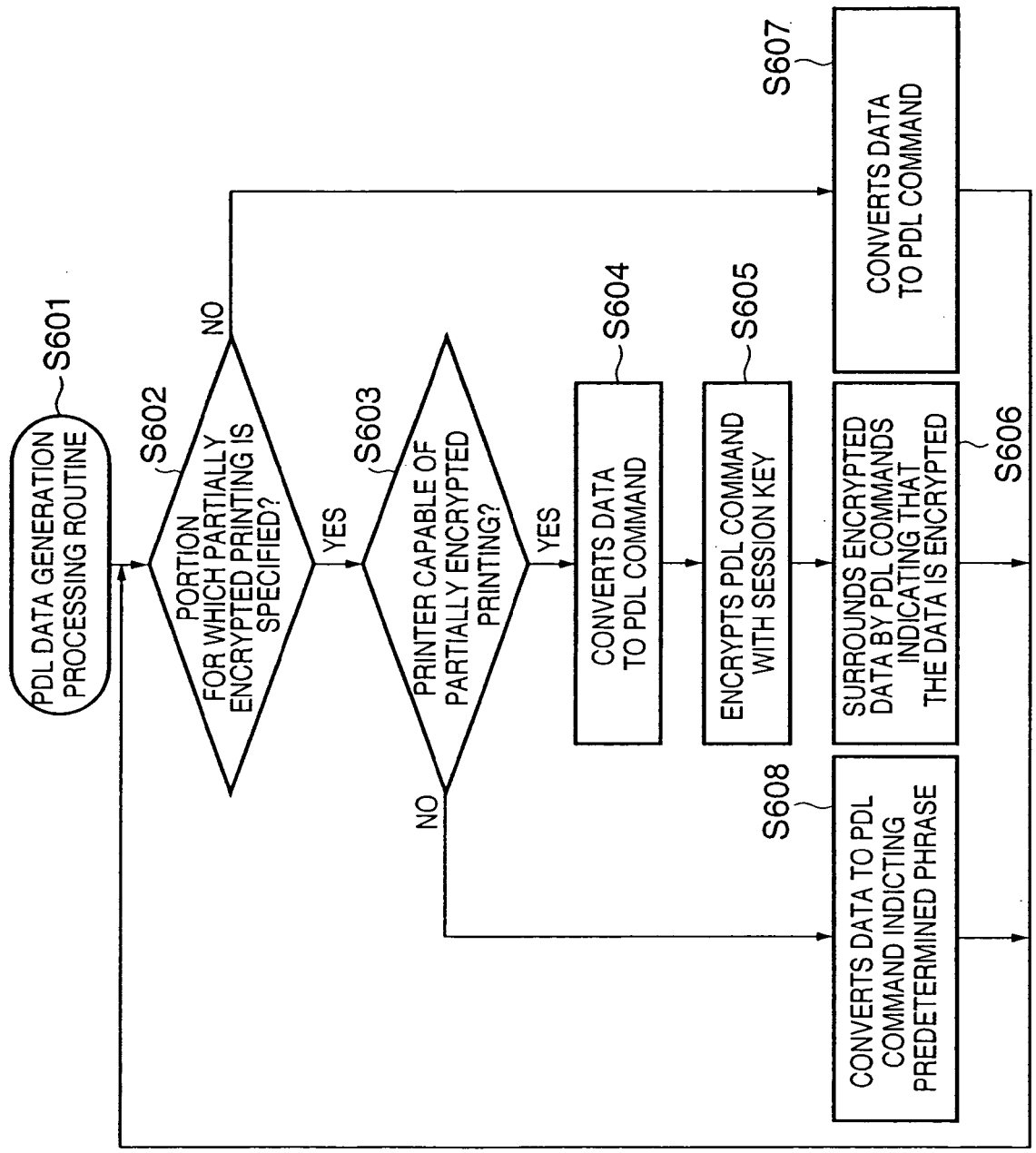
FIG. 6 is a flowchart showing the operation of step S508 in FIG. 5.

FIG. 6 is a flowchart showing the operation of step S508 in the flowchart of FIG. 5. Print data generated by the application 105 is, for example, defined for each object in this embodiment, and the PDL data processing in FIG. 6 is performed for each object. However, the unit of processing is not limited to an object, and the processing may be performed for each line or each band.

When the program starts (step S601), the encryption specification recognizing section 114 of the driver 106 first determines whether print data to be processed is an encryption specified portion (a portion for which encryption is specified) at step S602. If it is an encryption specified portion, then the process proceeds to step S603. At step S603, the encryption specification recognizing section 114 inquires of the printer information management section 112 about whether the output destination printer is a printer capable of partially encrypted printing. If the printer is capable of partially encrypted printing, then the process proceeds to step S604, where the data to be processed is converted to PDL commands. The process then proceeds to step S605, where the PDL command generated at step S604 is encrypted by the session key generated at step S506. At step S606, the encrypted data is surrounded by PDL commands which indicate that the data is encrypted, and the process proceeds to step S602 (see the PDL data 1212 in FIG. 12).

If it is determined at step S602 that the portion to be processed is not an encryption specified portion, then the process proceeds to step S607, where the portion to be processed is converted to PDL commands, and the process proceeds to step S602.

If it is determined at step S603 that the printer to be used is not a printer capable of partially encrypted printing, then the process proceeds to step S608, where the data to be processed is converted to a PDL command which indicates a predetermined phrase (for example, "encrypted"), and the process proceeds to step S602 (see the PDL data 1213 in FIG. 12). The PDL data generation routine in FIG. 6 is repeatedly executed until all the print data are converted to PDL.

In this way, the application or the printer driver confirms whether or not to continue print processing of document data including data specified by encryption specifying tags, an example of specification information, from a user. If continuation of the print processing is confirmed, then the document is generated after replacing the data specified by the encryption specifying tags with a predetermined character string. It is also possible to simply delete the data to be processed. If it is confirmed not to continue the print processing, then the printer driver terminates generation of the print data based on the document data.

As described above, the driver of a printer capable of partially encrypted printing sends PDL data in which a specified portion is encrypted to a printer capable of partially encrypted printing. Meanwhile, in the case of a printer incapable of partially encrypted printing, the driver terminates the processing or sends the data to the printer after replacing an encryption-target portion with different data, such as a character string. Consequently, even in the case of using a legacy printer, it is possible to protect data specified to be encrypted.

<Operation of a Printer (Incompatible with XAML)>

Figure 7:
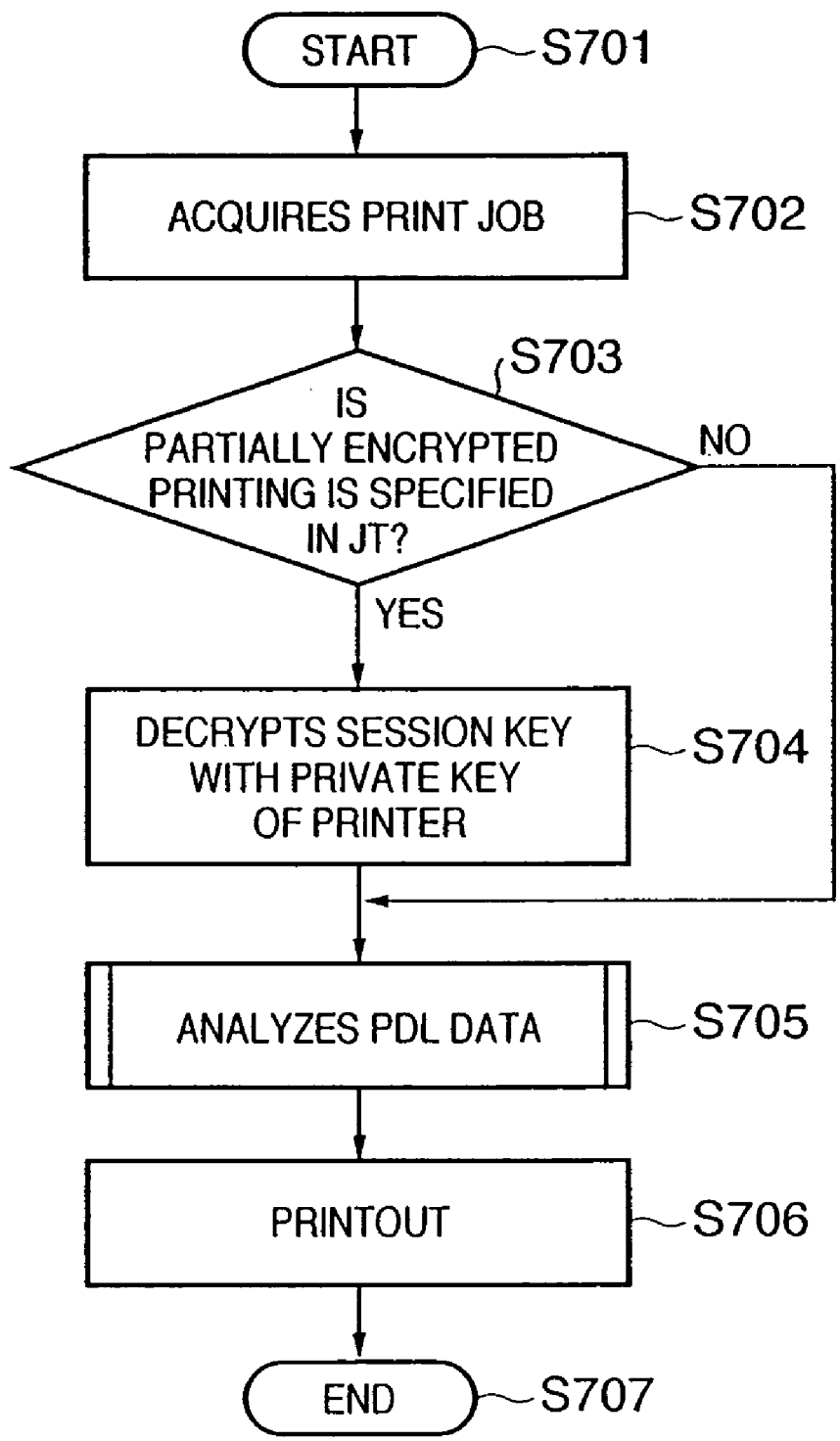
FIG. 7 is a flowchart showing the operation of a PDL printer in the system of FIG. 1.

FIG. 7 is a flowchart showing the operation of the printer 104 in the system of FIG. 1. Here, the printer 104 is assumed to be a PDL printer which is capable of partially encrypted printing. This operation is performed by the CPU 201 of the printer 104. When the program starts (step S701), the print job acquisition section 121 acquires a print job at step S702, and the process proceeds to step S703. At step S703, the print job analysis section 120 determines whether or not there is encryption specifying information 1201 indicating that data for which partially encrypted data is included in a JT (job ticket: information added as header of PDL data, for example). If the encryption specifying information 1201 exists, then the process proceeds to step S704. At step S704, a partial-encryption processing section 123 accesses the public key/private key management section 124 to read the public key of the printer, decrypts a session key added to the job and encrypted, with the use of the public key, and stores it at a predetermined memory location. The process proceeds to step S705. At step S705, the print job analysis section 120 analyzes all the print job, and the process proceeds to step S706. At step S706, the printout section 125 performs printout, and the process ends. On the other hand, if partial encryption specification is not included in the JT at step S703, then the process proceeds to step S705.

Figure 8:
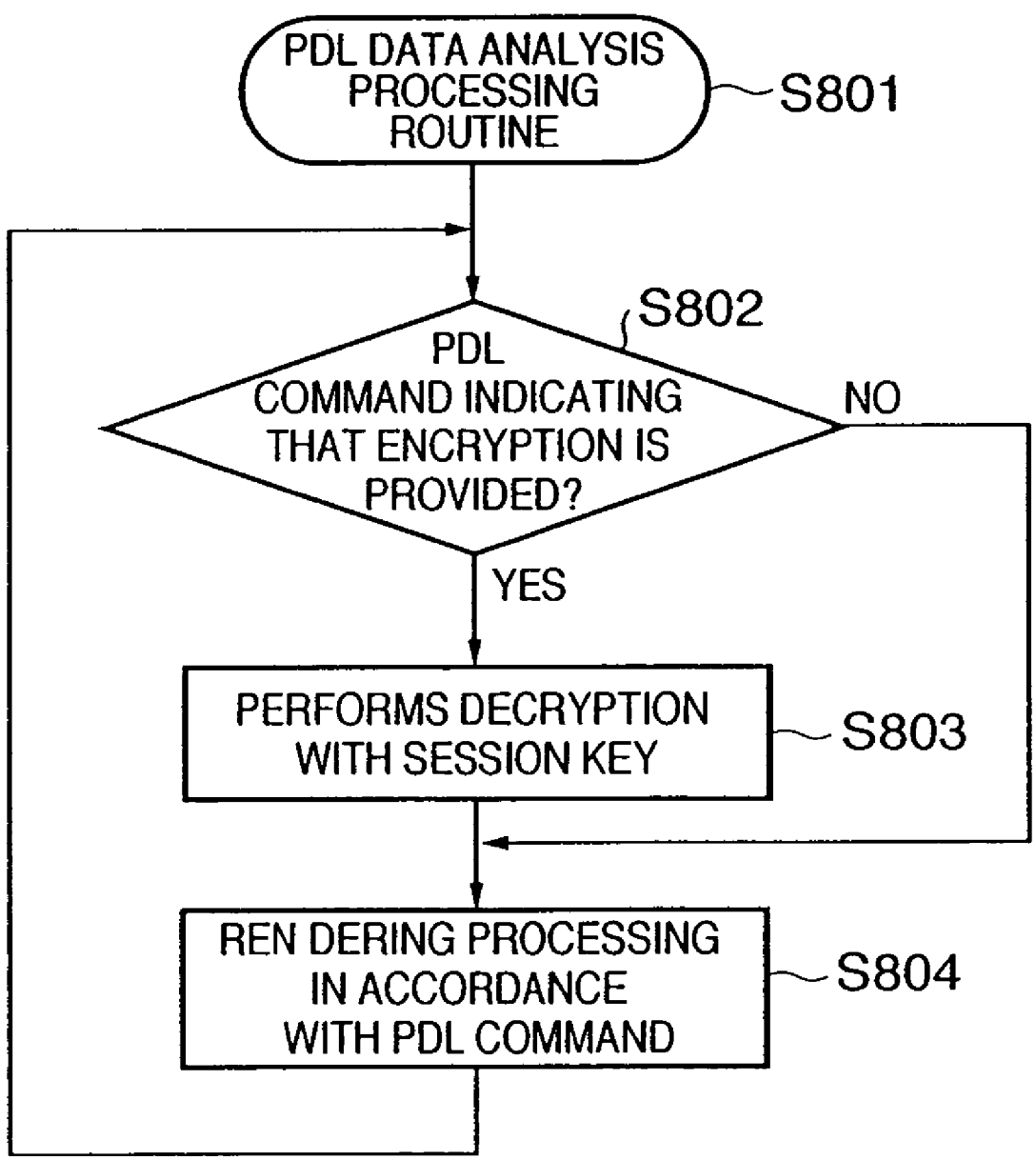
FIG. 8 is a flowchart showing the operation of step S705 in FIG. 7.

FIG. 8 is a flowchart showing the operation of step S705 in the system of FIG. 7. The processing of FIG. 8 is performed for each PDL command. This operation is performed by the CPU 201 of the printer 104. When the program starts (step S801), the print job analysis section 120 first determines at step 802 whether a PDL command to be processed is a PDL command which indicates that encryption has been performed. If it is a PDL command which indicates that encryption has been performed, then the process proceeds to step S803. At step S803, the partial-encryption processing section 123 decrypts the portion (the operand portion in the PDL command) with the session key stored at step S704, and the process proceeds to step S804. At step S804, the print job analysis section 120 performs rendering processing in accordance with a PDL command obtained by decryption, and the process proceeds to step S802.

On the other hand, if the PDL command to be processed is not a PDL command which indicates that encryption has been performed, at step S802, then the process proceeds to step S804.

As described above, the PDL printer capable of partially encrypted printing can decrypt an encrypted portion to form and print out an image intended to be printed. The printer 151 which is not capable of partially encrypted printing performs image formation processing through steps S702, S804 and S706 in that order. Therefore, when an encryption-target portion has been replaced with a different character string or the like by the driver, the character string is printed out instead of the encryption-target data, which is originally intended to be printed.

<Procedure for Print Processing by a Printer Driver (Compatible with XAML)>

Figure 9:
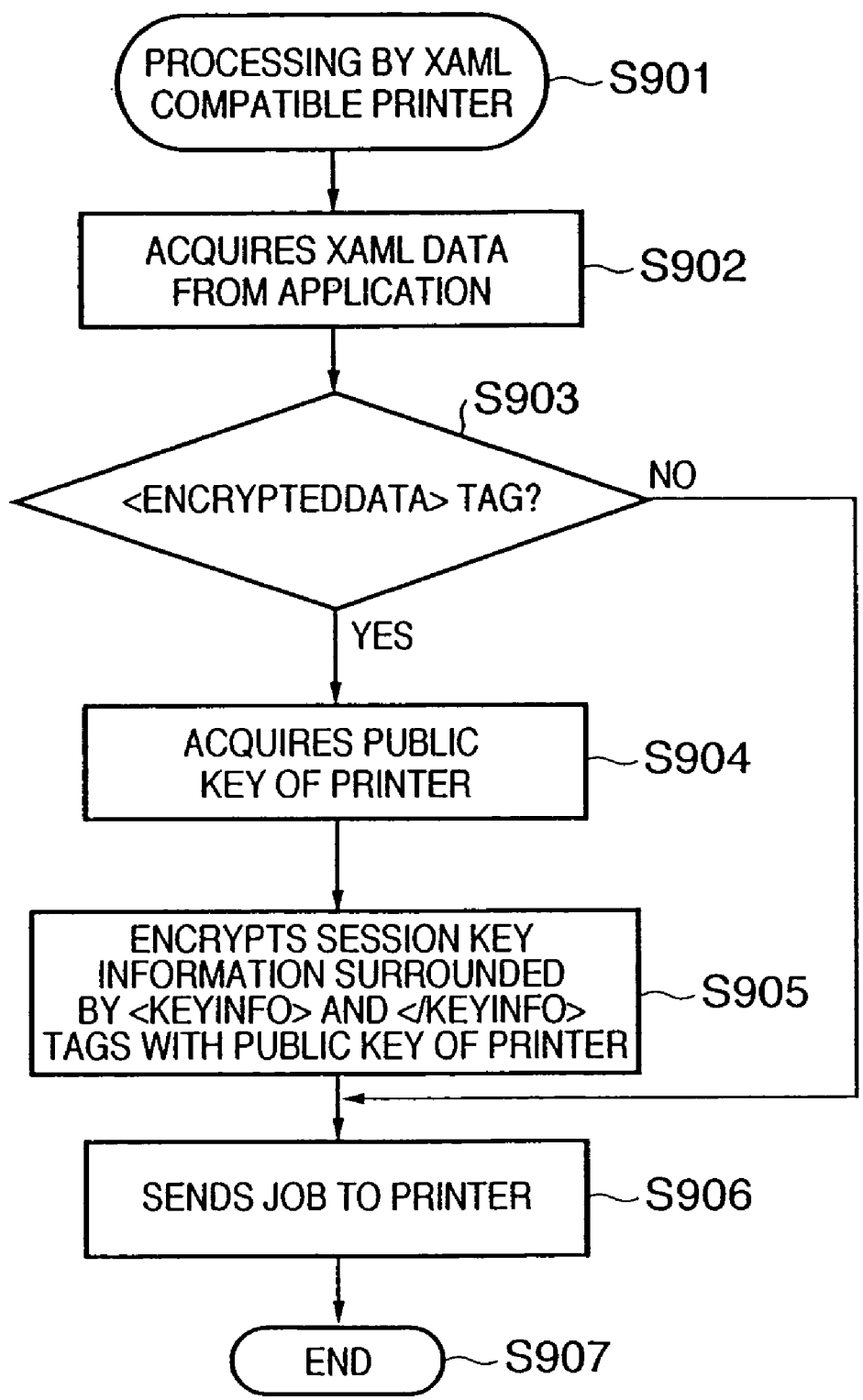
FIG. 9 is a flowchart showing the operation of step S405 in FIG. 4.

FIG. 9 is a flowchart showing the operation at step S405 in the system of FIG. 4. This operation is performed by the CPU 201 of the client 102. When the program starts (step S901), the print data acquisition section 111 of the driver 106 acquires XAML print data (see the data 1221 in FIG. 12) from the application 105 at step S902, and the process proceeds to step S903. At step S903, the encryption specification recognizing section 114 of the print job generation section 113 analyzes the XAML print data to determine whether there is an <EncryptedData> tag. If there is an <EncryptedData> tag, then the process proceeds to step S904. At step S904, the encryption processing section 115 acquires the public key of the printer from the printer information management section 112, and the process proceeds to step S905. At step S905, the encryption processing section 115 which is an example of first encryption means encrypts session key information surrounded by <KeyInfo> and </KeyInfo> tags with the public key of the printer acquired at step S904 and replaces the session key information surrounded by the <KeyInfo> and </KeyInfo> tags with the encrypted session key information, and the process proceeds to step S906 (see the data 1222 in FIG. 12).

Figure 14:
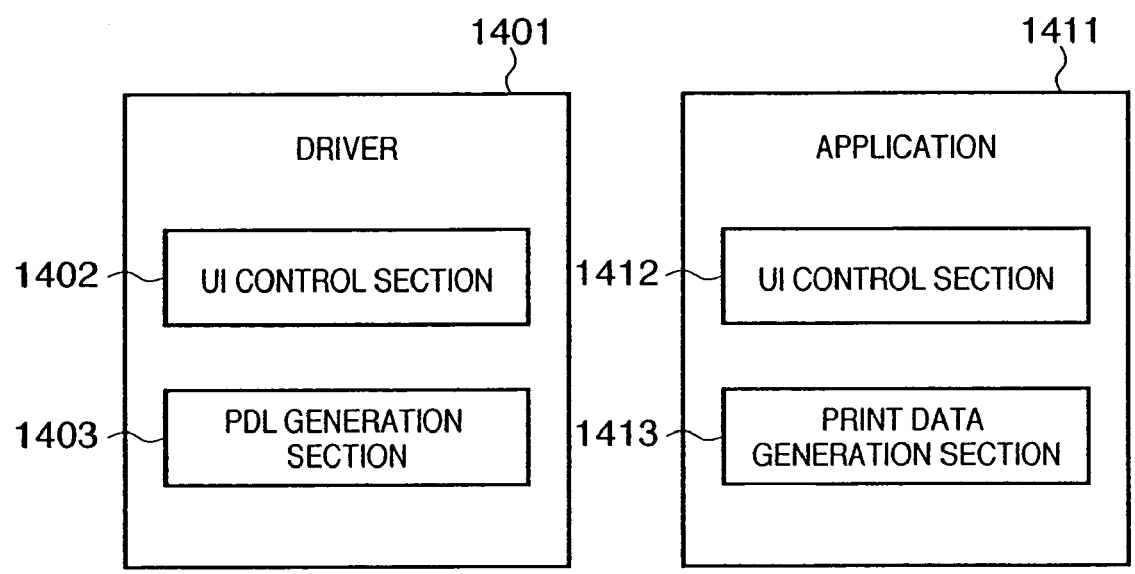
FIG. 14 shows examples of module configuration diagrams of the application and the driver of this embodiment.

This operation may be performed by the print data generation section 1413 of the application 1411 in FIG. 14. In such a case, the print data for which the processing from steps S901 to S905 has been performed by the print data generation section 1413 is handed to the driver 106.

In the case where the printer 104, which is an example of a printing apparatus capable of interpreting document data generated by the application 1411 is selected as the output destination, the document data is encrypted with the use of the encryption processing section of the printer driver, the operating system or the application.

In the case where another printer, which is an example of a printing apparatus incapable of interpreting document data generated by the application 1411 is selected as the output destination, the application 1411 inputs the document data into the PDL generation section 1403 of the printer driver without encrypting it.

The CPU 201 generates print data by executing the PDL generation section 1403 of the printer driver based on the document data inputted by the application 1411. The generated print data is encrypted by the encryption processing section of the printer driver, the operating system or the application. The document data encrypted by the encryption processing section or the print data encrypted by the encryption processing section is sent via the LAN card 205 controlled by the OS.

Whether a printer capable of interpreting the document data as the output destination or a printer incapable of interpreting the document data as the output destination may be determined by the application acquiring information acquired by the printer driver, from the printer driver. For example, as the information to be acquired from the printer driver, the model name of a printer, a name of a driver installed in a host and selected as the printing destination, and a port name corresponding to the printer are included. It may be determined by the application or the printer driver based on the result of the determination by the application or the printer driver whether the document data should be encrypted and sent to the printing apparatus or the application should input the document data to the printer driver without encrypting it.

Furthermore, an encryption specifying tag, an example of specification information, may be inputted via the user interface shown in FIG. 13A. That is, the encryption specifying tag, an example of specification information, is inputted via the user interface of the client 102.

Then, the application 1411 or the printer driver 1401 for determining whether a tag character string, an example of information included in document data, and the encryption specifying tag, an example of specification information, inputted via the user interface correspond to each other makes determination.

Then, if it is determined that the tag character string included in the document data and the encryption specifying tag inputted via the user interface correspond to each other, then data specified by the corresponding tag character string is identified as an encryption-target portion by the application 1411 or the driver 1401. The processing for displaying the user interface of the input screen (FIG. 13A) on a CRT 208 may be controlled by the UI control section 1402 of the driver 1401 in FIG. 14. Alternatively, the processing for displaying the user interface of the input-screen (FIG. 13A) on a CRT 1412 may be controlled by the UI control section 1412 of the application 1411 in FIG. 14.

On the other hand, if it is determined at step S903 that there is not an <EncryptedData> tag, then the process proceeds to step S906. At step S906, the print job sending section 116 sends the print job to the printer, and the process ends.

As described above, the driver of this embodiment sends XAML data generated by the application to an XAML printer after encrypting a session key, as required, or immediately.

<Operation of a Printer (Compatible with XAML)>

FIG. 10 is a flowchart showing the operation of the printer 104 in the system of FIG. 1. Here, the printer 104 is an XAML printer. This operation is performed by the CPU 201 of the printer 104. When the program starts (step S1001), the print job acquisition section 121 acquires a print job at step S1002, and the process proceeds to step S1003. At step S1003, the encryption specification recognizing section 122 of the print job analysis section 120 determines whether there is an <EncryptedData> tag. If there is an <EncryptedData> tag, then the process proceeds to step S1004. At step S1004, the encryption processing section 123 accesses the public key/private key management section 124 to acquire the private key of the printer, and uses the acquired private key to decrypt the portion surrounded by <KeyInfo> and </KeyInfo> tags, that is, a session key, with the acquired private key. At step S1005, the encryption processing section 123 decrypts the portion surrounded by <CipherData> and </CipherData> tags with the decrypted session key, and the process proceeds to step S1006. At step S1006, the printout section 125 performs printout in accordance with the description in XAML, and the process ends.

On the other hand, if it is determined at step S1003 that there is not an <EncryptedData> tag, then the process proceeds to step S1006, where the XAML data is interpreted, and printout is performed.

<Method for Specifying a Portion to be Encrypted from an Application UI to Generate Print Data>

Figure 15:
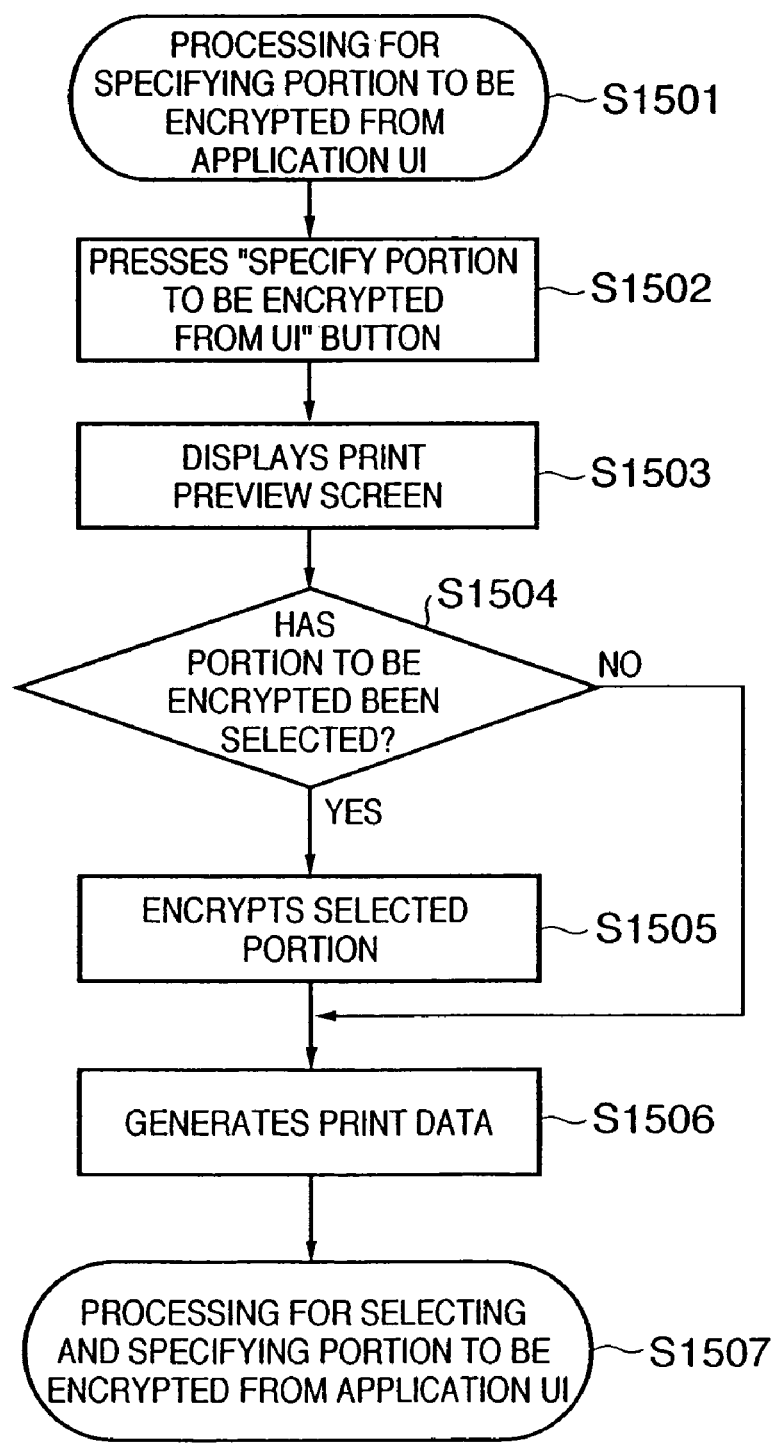
FIG. 15 is a flowchart of the operation for selecting and specifying a portion to be encrypted from an application UI.
Figure 16:
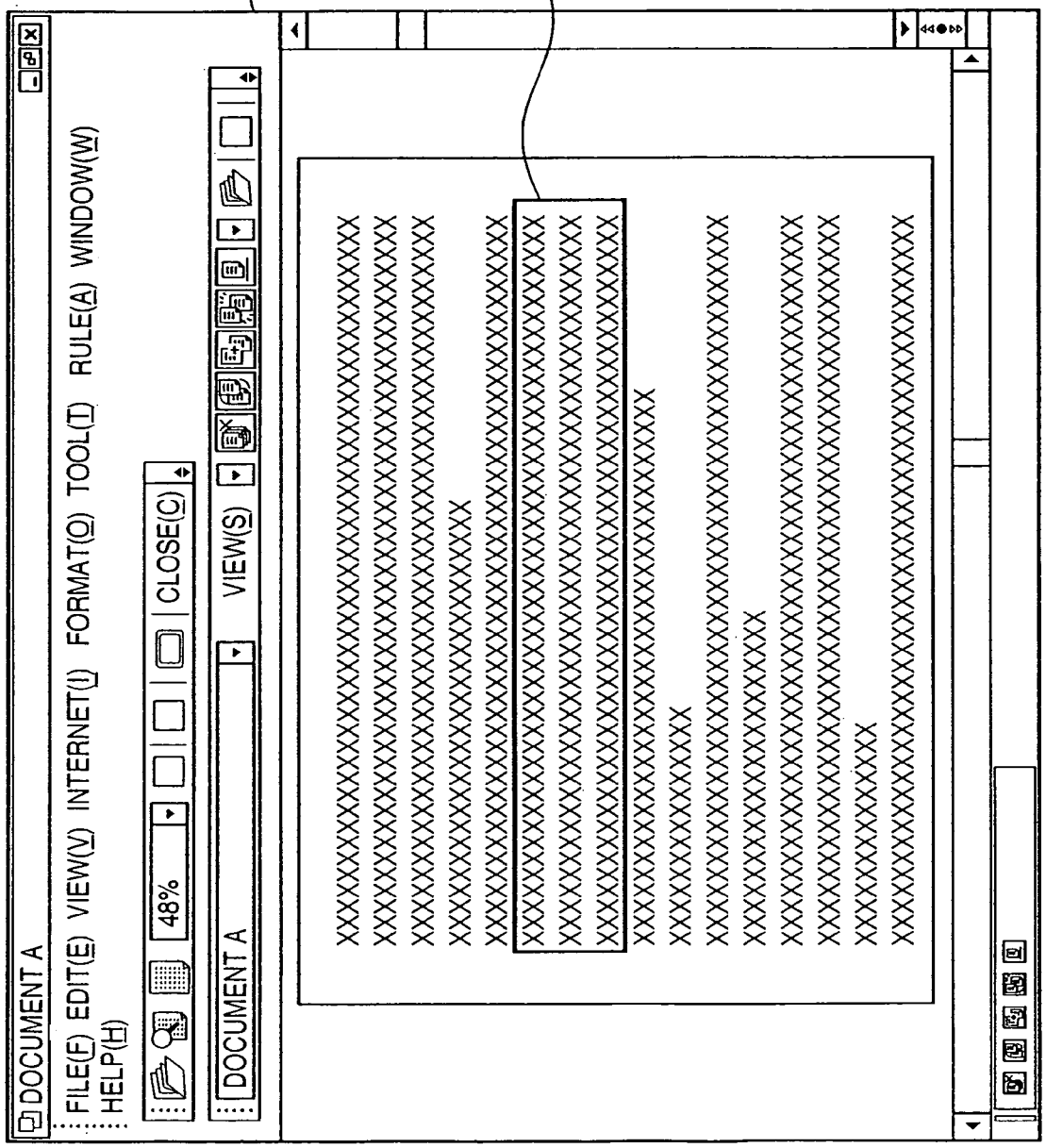
FIG. 16 shows an example of the UI in step S1504 in FIG. 15.

Description has been made on a method for making it more convenient to specify a portion to be encrypted by registering tags. Now, description will be made on a method for specifying a portion to be encrypted from an application UI on demand with reference to FIGS. 15 and 16.

This program is executed by the application 105. By pressing a "specification of a portion to be encrypted from UI" button of the application 105 (step S1502), a print preview screen is displayed (step S1503). If any portion to be encrypted is selected on the UI by mouse drag (FIG. 16) at step S1505, print data is generated after the selected portion is surrounded by <EncryptedData> and </EncryptedData> tags, and the process ends. This operation may be performed by the driver 1401. In this case, the print preview screen is displayed by the driver UI control section 1402, and encryption and generation of print data are performed by the PDL generation section 1403.

As described above, according to this embodiment, by having means for recognizing data for which partial encryption is specified, partial encryption of print data can be realized. Since a printer does not have to decrypt the entire print data, it is possible to protect the data between a driver and the printer while maintaining performance. Furthermore, even if the printer to be used is a printer incapable of handling partial encryption, it is possible, by converting data of a portion to be encrypted to data which can be processed by the printer, to prevent an unintended operation from being caused due to shutdown of the printer or due to interpretation of the encrypted data as a plaintext PDL command, without deteriorating security of the data. Furthermore, by sending data to a printer in a data format supported by the printer based on whether the printer is capable of handling specification of partial encryption in XML, the data can be sent to the printer in an XML format.

According to the present invention, by having means for recognizing data for which partial encryption is specified, partial encryption of print data can be realized. Since a printer does not have to decrypt the entire print data, it is possible to protect the data between a driver and the printer while maintaining performance.

Furthermore, according to another aspect of this embodiment, even if the printer to be used is a printer incapable of handling partial encryption, it is possible, by converting data of a portion to be encrypted to data which can be processed by the printer, to prevent shutdown or an unintended operation of the printer without deteriorating security of the data.

Furthermore, according to still another aspect of this embodiment, by sending data to a printer in a data format supported by the printer based on whether the printer is capable of handling specification of partial encryption in XML, the data can be sent to the printer in an XML format.

<Other Embodiments>

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

[Claim of Priority]

This application claims priority from Japanese Patent Application No. 2004-262967 on Sep. 9, 2004 and Japanese Patent Application No. 2005-246434 on Aug. 26, 2005, which are hereby incorporated by reference herein.

What is claimed is:

1. A print controlling apparatus that executes a printer driver for generating a print job to be sent to a destination image forming apparatus based on data acquired from an application capable of processing document data described in a markup language, said print controlling apparatus comprising a Central Processing Unit that executes the printer driver, wherein the following units are realized by functions of the printer driver:

a receiving unit that receives partially encrypted document data described in the markup language from the application, if the destination image forming apparatus is capable of partially encrypted printing;

a sending unit that sends the partially encrypted document data received by said receiving unit to the destination image forming apparatus as the print job;

a notification unit that notifies the application that the destination image forming apparatus is incapable of partially encrypted printing, if the destination image forming apparatus is incapable of partially encrypted printing; and a generation unit that generates the print job using a page description language based on data received from the application, wherein the application makes a query to a user about whether to carry on the printing process if the destination image forming apparatus is incapable of partially encrypted printing, the application does not encrypt document data described in the markup language and sends non-encrypted document data to the print controller when the user responds that the printing process is to be carried on in response to the query, said generation unit generates the print job based on data which is the remainder of the non-encrypted document data received from the application, from which a portion to be partially encrypted has been removed, and said sending unit sends the print job generated by said generation unit to the destination image forming apparatus.

2. A print control method that executes a printer driver for generating a print job to be sent to a destination image forming apparatus based on data acquired from an application capable of processing document data described in a markup language, the method comprising:

receiving partially encrypted document data described in the markup language from the application, if the destination image forming apparatus is capable of partially encrypted printing;

sending the partially encrypted document data received in said receiving step to the destination image forming apparatus as the print job;

notifying the application that the destination image forming apparatus is incapable of partially encrypted printing, if the destination image forming apparatus is incapable of partially encrypted printing; and generating the print job using a page description language based on data received from the application, wherein the application makes a query to a user about whether to carry on the printing process if the destination image forming apparatus is incapable of partially encrypted printing, the application does not encrypt document data described in the markup language and sends non-encrypted document data to the print controller when the user responds that the printing process is to be carried on in response to the query, said generating step generates the print job based on data which is the remainder of the non-encrypted document data received from the application, from which a portion to be partially encrypted has been removed, and said sending step sends the print job generated in said generating step to the destination image forming apparatus.

3. A non-transitory computer-readable storage medium embodying a program for performing a print control method that executes a printer driver for generating a print job to be sent to a destination image forming apparatus based on data acquired from an application capable of processing document data described in a markup language, the method comprising:

receiving partially encrypted document data described in the markup language from the application, if the destination image forming apparatus is capable of partially encrypted printing;

sending the partially encrypted document data received in said receiving step to the destination image forming apparatus as the print job;

notifying the application that the destination image forming apparatus is incapable of partially encrypted printing, if the destination image forming apparatus is incapable of partially encrypted printing; and generating the print job using a page description language based on data received from the application, wherein the application makes a query to a user about whether to carry on the printing process if the destination image forming apparatus is incapable of partially encrypted printing, the application does not encrypt document data described in the markup language and sends non-encrypted document data to the print controller when the user responds that the printing process is to be carried on in response to the query, said generating step generates the print job based on data which is the remainder of the non-encrypted document data received from the application, from which a portion to be partially encrypted has been removed, and said sending step sends the print job generated in said generating step to the destination image forming apparatus.

4. The print controlling apparatus according to claim 1, wherein the partially encrypted document data is encrypted using a public key of the destination image forming apparatus.

5. The print control method according to claim 2, wherein the partially encrypted document data is encrypted using a public key of the destination image forming apparatus.

6. The non-transitory computer-readable storage medium according to claim 3, wherein the partially encrypted document data is encrypted using a public key of the destination image forming apparatus.

* * * * *